Figure 1:
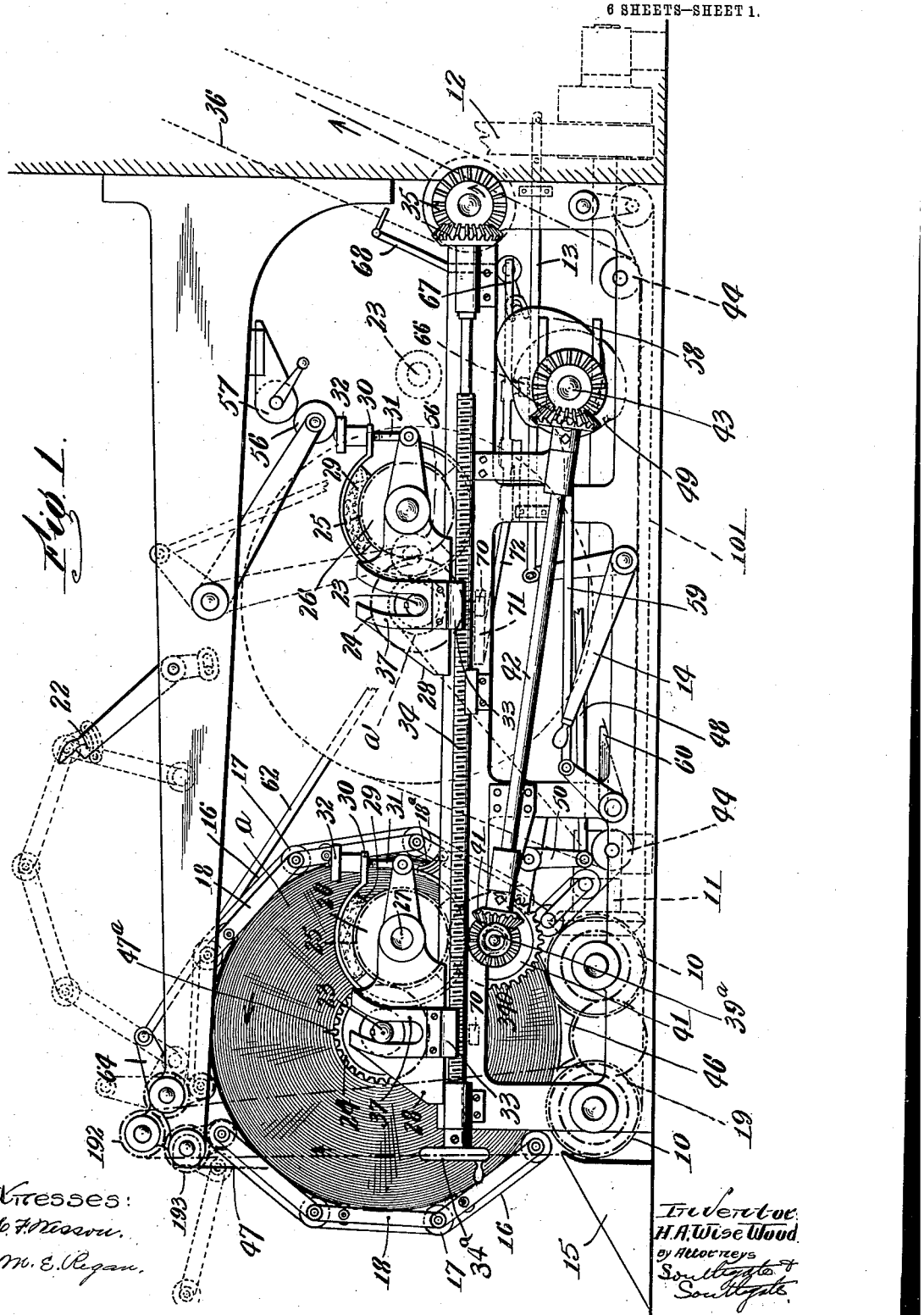

H. A. W. WOOD.
CHANGE WEBB ROLL MECHANISM.
APPLICATION FILED SEPT. 22, 1906. RENEWED JUNE 11, 1914.

1,122,834.

Patented Dec. 29, 1914.
6 SHEETS—SHEET 1.

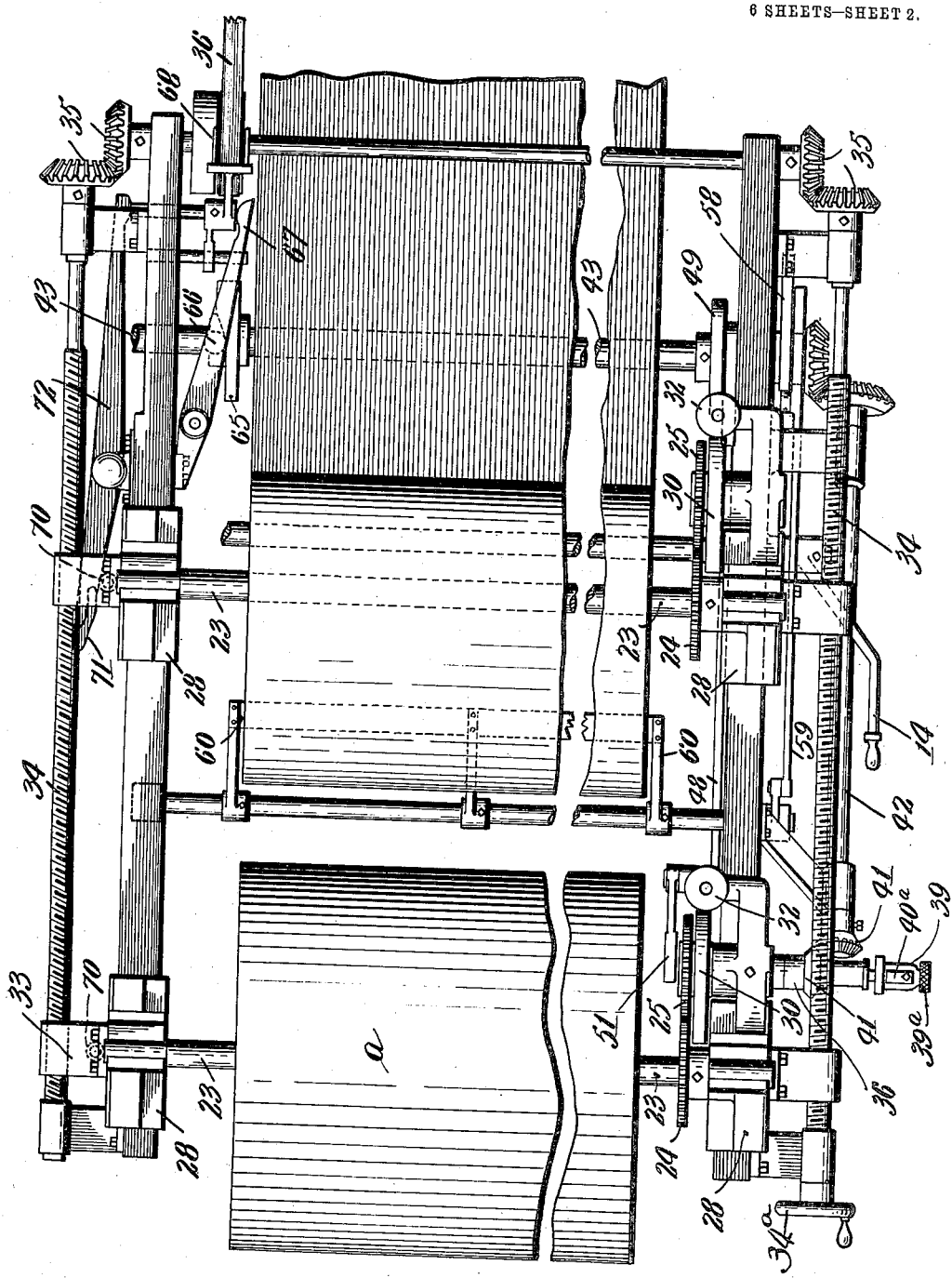

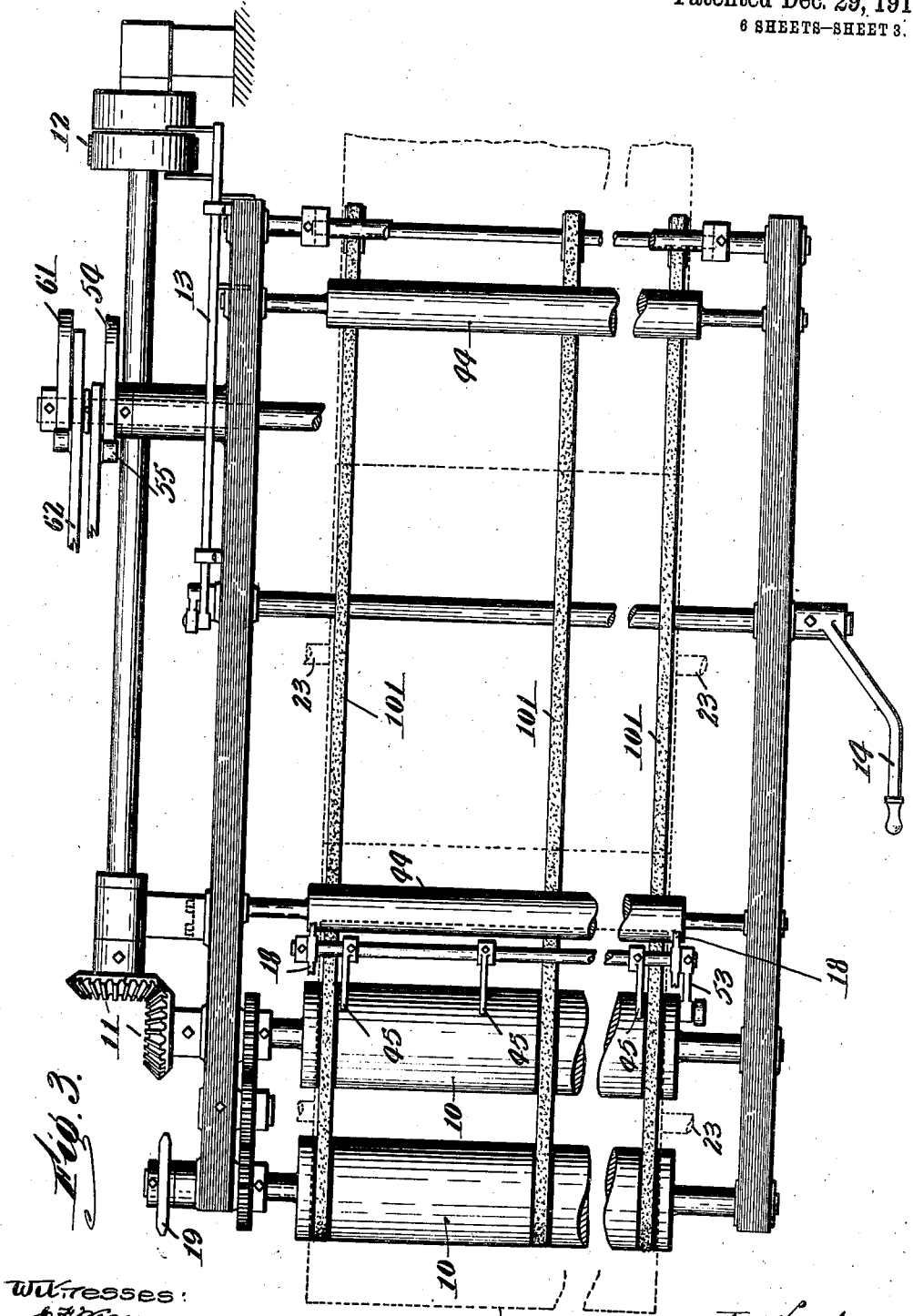

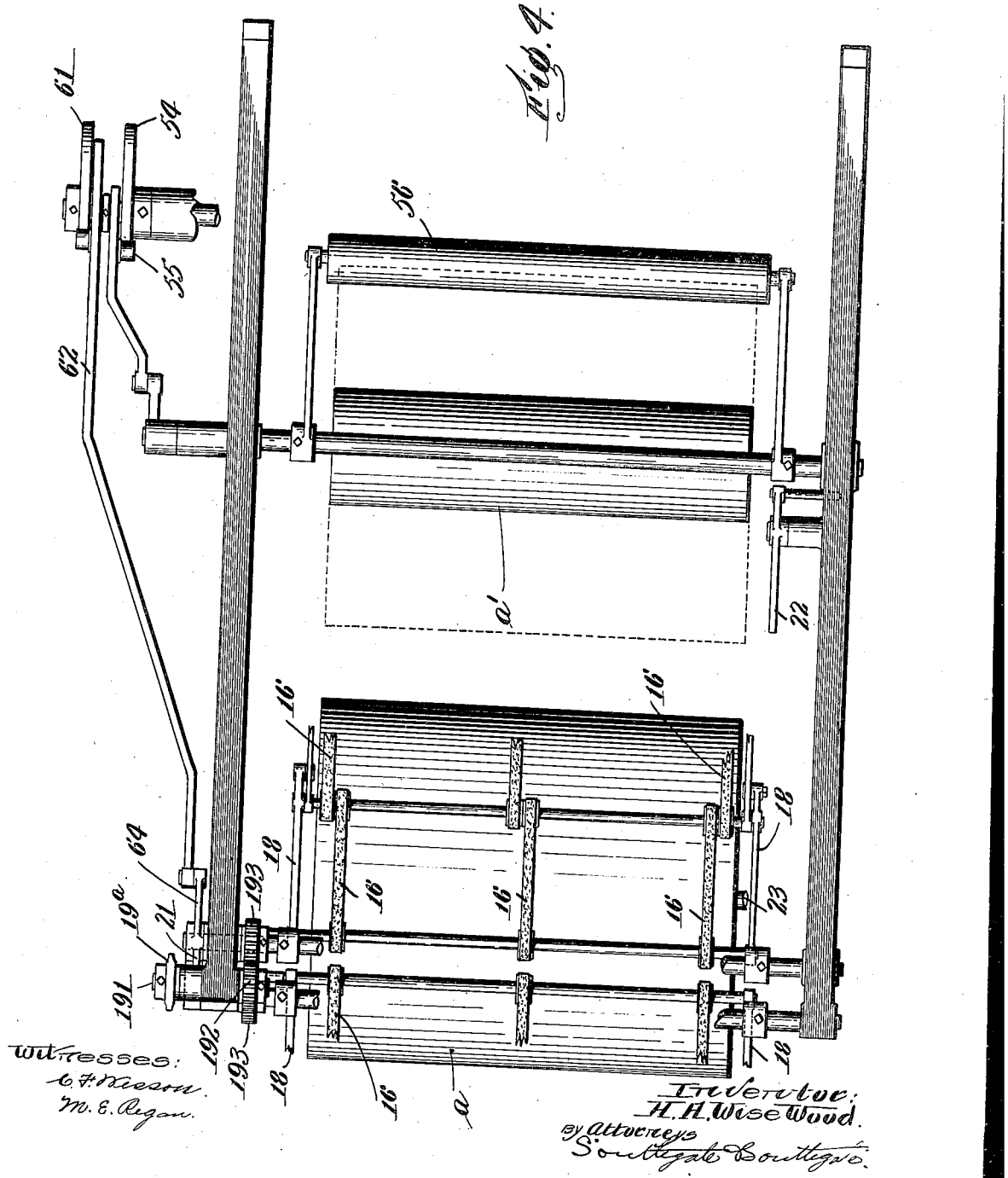

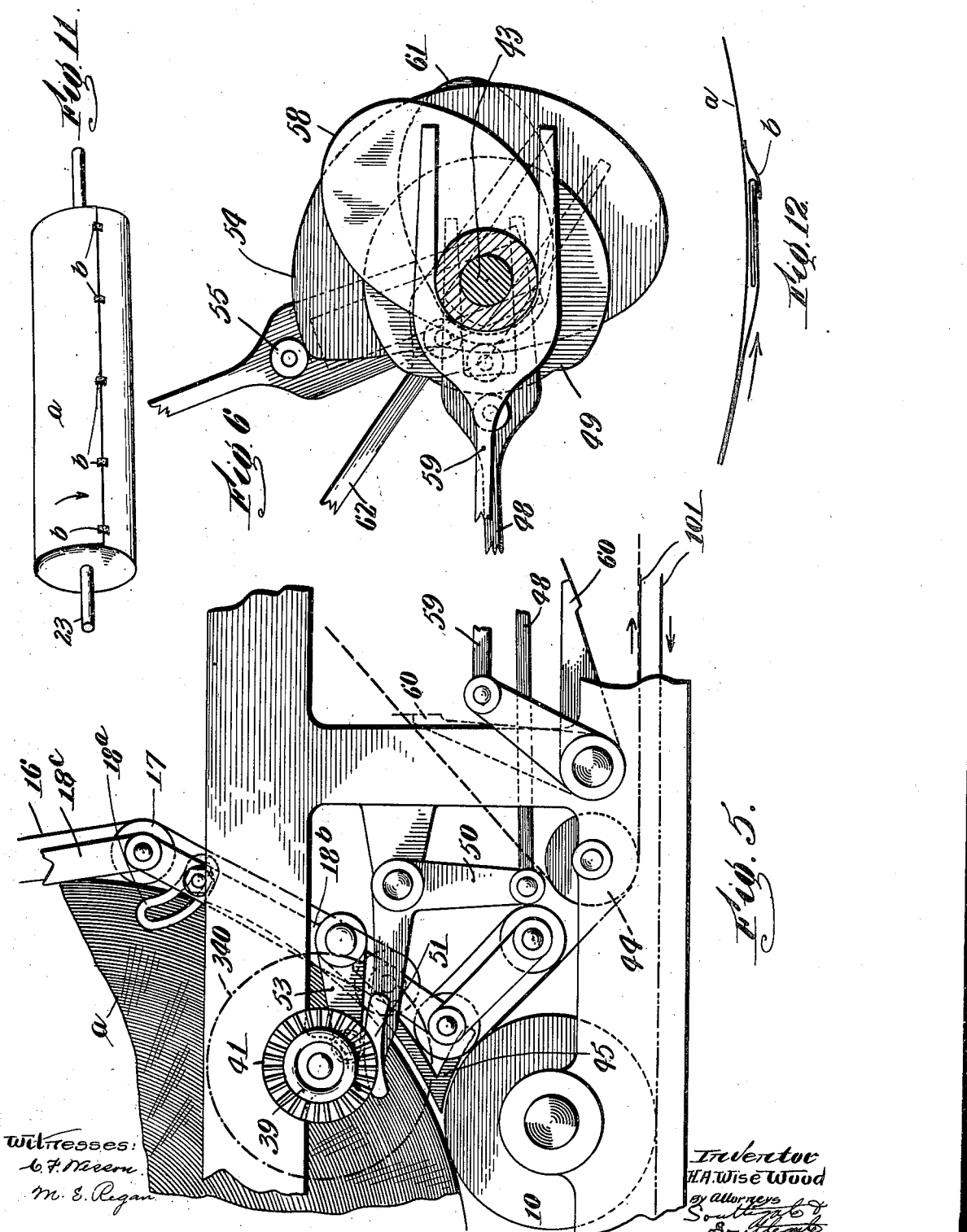

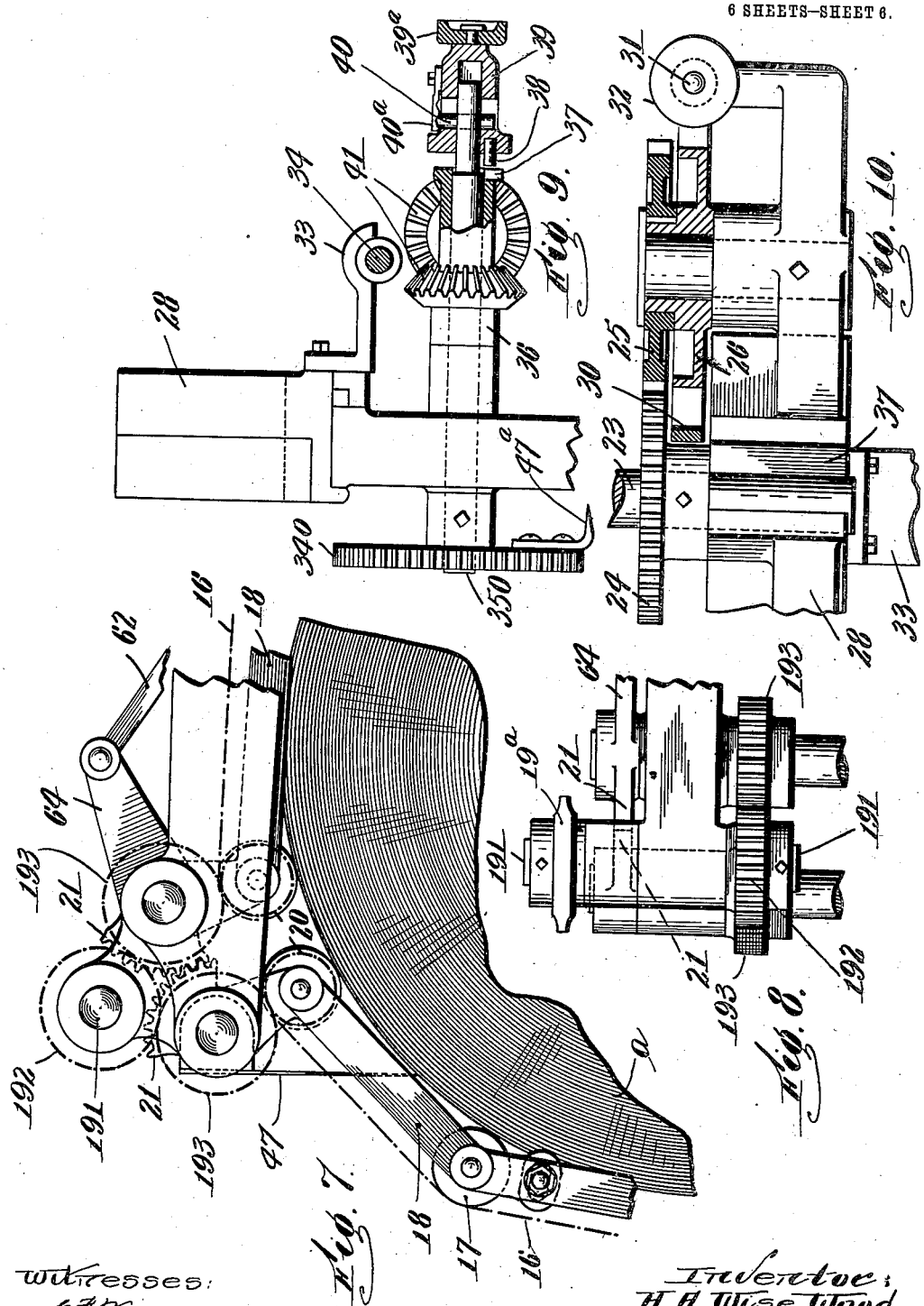

UNITED STATES PATENT OFFICE.

HENRY A. WISE WOOD, OF NEW YORK, N. Y., ASSIGNOR, BY MESNE ASSIGNMENTS, TO WOOD NEWSPAPER MACHINERY CORPORATION, OF NEW YORK, N. Y., A CORPORATION OF VIRGINIA.

CHANGE-WEB-ROLL MECHANISM.

1,122,834.

Specification of Letters Patent.

Patented Dec. 29, 1914.

Application filed September 22, 1906, Serial No. 335,788. Renewed June 11, 1914. Serial No. 844,584.

*To all whom it may concern:*

Be it known that I, HENRY A. WISE WOOD, a citizen of the United States, residing at New York, in the county of New York and State of New York, have invented a new and useful Change-Web-Roll Mechanism, of which the following is a specification.

My invention relates to mechanism for changing the web rolls for rotary and other printing presses, the principal objects thereof being to provide means for accomplishing the change of the rolls at full speed so that it will not be necessary to slow up the machine in order to perform this operation, and to provide means for accomplishing this result in a simple and effective manner.

Further objects and advantages of the invention will appear below.

Reference is to be had to the accompanying drawings in which,

Figure 1 is a side elevation of a change web roll device embodying the principles of my invention and showing a practical way of applying them. Fig. 2 is a plan of the same. Fig. 3 is a plan of the lower portion of the same, parts above being removed. Fig. 4 is a plan showing a web roll in initial position with tapes around it. Fig. 5 is a side elevation on an enlarged scale of a portion of the device. Fig. 6 is a sectional view of a cam shaft for operating several parts, the cams appearing in elevation. Fig. 7 is a side elevation of another portion of the device showing the tape operating mechanism. Fig. 8 is a plan of parts shown in Fig. 7. Fig. 9 is a rear elevation of a portion of the carriage and clutch device. Fig. 10 is a plan of the same partly broken away, and Fig. 11 is a perspective view of a web roll showing one way of securing the forward end. Fig. 12 is an end elevation of the same showing how the end of the web is folded over and secured to the roll.

Important objects to be accomplished are to bring the forward end of the web of a new roll *a* of paper into contact with the expiring end of a second roll of paper in dotted position *a'* of Fig. 1, to paste them together, cut the latter, and to accomplish these results in such a manner that the pasted and cut portion of the web of roll *a'* shall properly register with the leading end of the web of roll *a*, whereby the outgoing end of the paper of roll *a'* will have secured to it the forward end of the paper of the roll *a*, and the web during the change from one to the other roll, will pass forward in an uninterrupted manner without the necessity for slowing-down the speed of the press.

Rolls of paper as *a*, ordinarily supplied, are of somewhat varying diameters. Consequently, when they are placed in the machine at the position *a* on a pair of propelling drums 10, although the speed of the drums may be known, the position of any given point upon the surface of the roll, as for instance the forward end of its web is entirely indefinite. Consequently, the propelling drums themselves cannot be employed to operate the change mechanism in such a manner as to present the leading end of the roll *a* in register with the expiring end of the roll *a'*. On account of this difficulty I have provided means whereby some or all of the various mechanisms for controlling the several necessary operations are operated from the spindle or core of the new roll itself, while it is in its initial position *a*, in such a manner that they will start only when the forward end of the paper on the roll *a* is in a given position, so that substantially perfect registration may result. Thus roll *a* becomes the prime mover of the principal mechanisms involved. These results are accomplished by mechanism which will now be described.

The propelling drums 10 are rotated in unison in the same direction by any desired means as for example, through gearing 11 and a belt 12, deriving power from any suitable source, preferably some point on the press. The drums are started and stopped by means of a belt-shifter 13 operated by a handle 14 in an obvious manner. The drums also propel a series of tapes 101 which as will be described below guide the web of paper toward the press after it is unwound from the roll.

When a fresh web roll is to be put into place, it is run upon an incline 15 until it rests upon the drums 10. It is surrounded in its rotation by tapes 16 running over pulleys 17 to hold the web in position. Shafts for these pulleys are carried in arms 18 which are angularly adjustable to allow variations in the diameter of the roll. They are driven by a sprocket 19 on one of the propelling drums which communicates motion by means of a chain through a sprocket 19ª, short shaft 191, gears 192 intermediate gears 193, to gears 20 on the pulley shaft, or a motion of rotation can be communicated to the various tape shafts in any desired manner.

The arms 18 are lifted by gear segments 21 or the like, which are shown as fixed to shafts on which the gears 193 loosely turn, to swing the arms up out of the way and permit the web roll to be moved into and out of its initial position. When the arms are swung up, one of them engages a movable hook 22 and this holds both sets in elevated position until released. The lower part of the right hand arm 18ᵇ is pivoted, and moves down a guide 18ª in arm 18ᶜ to clear the roll in position $a'$ as it swings down. The means which I have illustrated for operating the gear segments will be described below.

The web roll $a$ is carried on a spindle 23 to which it is attached in the usual or any desired manner. Fastened to this spindle is a gear 24 which meshes with a gear 25 fastened to a friction drum 26 for preventing excessive speed. This drum runs loosely on a stud 27 mounted on a carriage 28 for supporting these parts. In contact with the drum 26 are friction members 29 held by a friction band 30, a screw 31 and hand-nut 32, or in any other manner.

Each spindle is supported by two carriages 28 carrying half-nuts 33 engaging with longitudinal screws 34 which constitute rotary roll moving means and are rotated in unison by any desired means, as for example, bevel gears 35 and belt 36, receiving power from any convenient source. A hand-wheel 34ª may be used for adjusting them.

It is to be noted that the carriage 28 is provided with an elongated curved bearing 370 for the spindle 23 to permit the same to descend in the bearing and to enable it to receive the spindle when the roll is put in place on the carriage. At this position of the roll, it being understood that the screws 34 are at this time stationary, the gear 25 meshes with a gear 340 of the same size as the gear 24, fastened on a shaft 350 as shown in Fig. 9.

Clutch mechanism is provided for connecting the shaft 350 with other mechanisms to start them into operation when the end of the paper on the spindle 23 reaches the proper point.

Loosely mounted on the shaft 350 is a sleeve 36 which is provided at a certain point with an eccentric socket 37 into which a pin 38 is adapted to enter. This pin is mounted on a knob 39 which is slidably mounted on the shaft 350 and is caused to turn therewith by a pin 40 moving in a slot in the knob. A spring detent 40ª having depressions for the pin 40 is used to hold the pin 38 in the cavity 37. The knob has a loosely journaled button 39ª. The pin and cavity being eccentric, there will be only one position of the shaft 350 in which the pin 37 will connect the shaft and sleeve together; consequently, when the clutch is thrown in, power will not be transmitted to the sleeve 36 until the shaft 350 and also the leading end of the web upon the web roll $a$ reaches a certain definite position; then power will be transmitted through gears 41 to a shaft 42 which operates a cam shaft 43 that controls various operating devices that have to do with the functions of changing the roll.

With this preliminary description of such operating parts, the remainder of the device can be described in connection with a description of its operation.

Assuming that the web roll is in position $a'$ on one carriage, having been brought into that position in a manner that will be described below, it is to be understood that it delivers the web around a roll 44 to the press, Fig. 1 showing in dotted lines the way in which the operation starts from a full roll and is completed when the roll is nearly exhausted when it becomes necessary to separate the paper from the spindle 23 to which it is fastened, first having pasted it and connected its end to the forward end of the next roll. For this purpose a new roll is passed up the incline 15 into the bearings 37 of another carriage, the taped guards being held up by the hook 22, as has been described. When the roll is placed in these bearings, it rests on the propelling drums, 10—10 by which it is driven. After it reaches its position the taped guards are restored to the working position shown in Fig. 1 and the roll may be substantially surrounded by them. The handle 14 being manipulated, the roll is then rotated at the full speed of the press. When the roll is placed in position, its forward end is folded square and drawn under in a plait, substantially as shown in Fig. 12, and if desired, the end of the web may be pasted in spots to the roll itself or secured thereto by pasted strips $b$ of weak paper. At the lower right-hand part of the roll is an ordinary web press switch 45 pivoted in the arm 18ᵇ, which can be thrown against the roll so as to enter between the forward edge of the paper and the roll itself, thus separating the forward edge and guiding it down through a taped path-way to the roller 44 where it comes in contact with the pasted end of the expiring web from the roll in position $a'$. The roll in position *a* may be run for as many idle revolutions as may be necessary and the switch 45 being drawn back there will be nothing to force the end of the paper away from the roll, nor anything to operate the other devices. I prefer sometimes to use a guard 46 to prevent the leading end of the web from getting crumpled or bent back. This may be used if desired to the exclusion of the pasting of the end of the paper to the roll. Now, when it becomes necessary to change the roll, the button 39ª is pushed in so as to force the pin 38 into the socket 37 in the end of the sleeve 36, entering the socket the first time it comes around to lock the end of the sleeve 36 to the shaft when the shaft reaches the proper angular position. When this occurs, the detent holds the knob in position and the shaft 42 commences to turn and with it the shaft 43. It is to be understood from what has previously been said, that the rotation of these shafts commences when the end of the paper on the roll *a* is in a definite position with relation to the mechanism driven by them. The rotation of the shaft 43 has a definite relation to that of the spindle 23, being positively driven therefrom and in the present case it makes one complete rotation to a rotation of said spindle.

In order to have the end of paper of roll *a* so positioned as to be in proper relation with the cam shaft 43, a blade 47 is fixed across said roll, and an indicator point 47ª is fixed in such position on the gear 340 that when it is brought in line with a mark or pointer on the side frame of the machine, by turning the roll *a* by hand, the roll will be in the right angular position so that the end of paper may be folded square, over the blade 47 and attached to the body of the roll *a* in the right place as before described. When the shaft 43 starts to revolve, it first operates a link 48 by means of a cam 49, the link being connected by bell-crank 50 with a cam 51 mounted upon it. This cam operates an arm 53 and thus forces the switch into position to disengages the edge of the paper from the roll and guide it beneath the switch down between tapes which direct it to the roller 44. At the same time the cam 54 on the shaft 43 operates a roller 55 which swings a paste roll 56 from contact with a fountain roll 57 from which it receives paste, downwardly into contact with the roll in the position *a'* as is indicated by dotted lines in Fig. 1. The paste roll remains in contact with the web roll long enough to apply paste over a large part of the surface thereof. This operation is timed so that the pasted end will reach the roll 44 at about the same time that the forward end of the sheet from the new roll reaches the same position. When this has taken place, a cam 58 on the shaft 43 operates a forked connection 59 which turns a serrated blade 60 into position to sever the paper of the outgoing roll from the spindle with which it is connected.

When the new web has been pasted to the outgoing web as described, another cam 61 on the shaft 43 operates a connection 62 to swing an arm 64 on a shaft carrying one of the gear segments 21 to raise the taped guards in a manner which previously has been described, and bring one of the arms carrying them into engagement with the hook 22. This moves the taped guards, and the switch 45 out of the way so as to permit the roll *a* to move into the dotted position *a'*. In the present instance, this is accomplished in the following manner: A side cam 65 on the shaft 43 operates a roll 66 which throws a lever 67 and moves a belt-shifter 68 to change the belt 36 from the loose to the tight pulley. This starts the screws 34 which are driven in the manner previously described. The result of this is to move all the carriages 28, which are in contact with the screws, until the new roll reaches the position of the old roll and the old roll moves out of gear with the screws 34 so that the nuts are disengaged from the screws and the carriages carrying the old roll or emptied spindle come to rest. The carriages carrying the new roll are stopped in the desired position by means of a roll 70 thereon coming into contact with a cam 71 on a lever 72. This lever is connected with the belt-shifter 68 and as the belt 36 is now swung out of operative position, it forces the belt-shifter back ready to be operated upon by the cam when it returns to operative position. This, of course, stops the rotation of the screws and leaves the carriages carrying the new roll in stationary position, *a'*. When the roll from the position *a* goes forward to the position *a'*, the time of travel is such that the gear 25 rolls out of mesh with the gear 340 when the latter has made one complete revolution, thus leaving the cam shaft mechanism in position to repeat its operation.

It will be seen from the description above given that the employment of this principle, whether in the form illustrated or otherwise within the scope of my invention as expressed in the claims, provides for changing the web roll of a printing press or other machine automatically and for performing all necessary operations upon both the old and the new web without altering the speed of the machine in any way, and that these objects are accomplished in a most simple and efficient manner.

While I have illustrated and described a particular embodiment in which I at present prefer to carry out my invention, I am aware that many changes may be made therein by any person skilled in the art and that the same can be used on other than printing machines without departing from the scope of the invention as expressed in the claims.

Having thus fully described my invention, what I claim and desire to secure by Letters-Patent is:—

1. A change web roll device for rotary printing presses, having means controlled by the spindle of a fresh roll for automatically substituting a fresh roll for an expiring one while the press is running at its full printing speed.

2. In a change web roll device for rotary printing presses the combination of means for pasting an outgoing web, means for feeding the end of a new web into contact with the pasted portion of the outgoing web at full printing speed of the press, and means controlled by a fresh web roll spindle for starting them into operation.

3. In a change web roll device for rotary printing presses, the combination of means for pasting an outgoing web, means for feeding the end of a new web into contact with the pasted portion of the outgoing web at full printing speed of the press, and means controlled by the new web roll for severing the outgoing web from the spindle thereof.

4. In a change web roll device for rotary printing presses, the combination of means for pasting an outgoing web, means for feeding the end of a web on a new roll into contact with the pasted portion of the outgoing web at full printing speed of the press, and screw shafts and co-acting devices for moving the new roll longitudinally of said shafts into the position formerly occupied by the old roll.

5. A change web roll device for printing presses, having means for bringing a fresh roll up to the speed of the press, means for attaching its forward end to the web of an expiring web roll while both are running at the same speed, and means directly controlled by the rotation of the web roll spindle for severing the expiring web from its core while the press is running at full speed.

6. A change web roll device for printing presses, having means for bringing a fresh web roll up to the speed of the press, endless bands feeding and attaching its forward end to the web of an expiring web roll while both are running at the same speed, means for severing the expiring web from its core, and screw shafts for moving the new roll into the position occupied by the expiring one while the press is running at full speed.

7. In a change web roll device, the combination of means for rotating a new web roll, means for moving the new roll into the place of an old roll, and means for starting the last named moving means into operation at a definite point in the rotation of the new web roll.

8. In a change web roll device, the combination of means for rotating a new web roll, means for moving the new web roll into the place of an old roll, means for starting the moving means into operation when the new web roll reaches a certain point in its revolution, and means for automatically stopping the roll moving means.

9. In a change web roll device, the combination of means for rotating a web roll, a switch for separating the forward end of the web of the roll from the roll, and means for automatically setting the switch into operation when the roll reaches a certain point in its revolution.

10. In a change web roll device, the combination of means for rotating a web roll on a spindle, a switch for separating the end of the web from the roll, and means for operating the switch from the spindle of the roll.

11. In a change web roll device, the combination of means for rotating a web roll on a spindle, a switch for separating the end of the web from the roll, means for operating the switch from the spindle of the roll, and a clutch for connecting the switch with the spindle at a definite point in a revolution of the roll.

12. In a change web roll device the combination of a web roll spindle and means controlled by said spindle, for separating the end of the web from the roll.

13. In a change web roll device the combination of a web roll spindle and means controlled by said spindle, for applying paste to a web on another spindle, means controlled by the first spindle for severing the pasted web from its spindle, and means controlled by the first spindle for applying the end of the web on the first spindle to the pasted web.

14. In a change web roll device the combination of a web roll spindle and means controlled by said spindle for bodily moving the roll and spindle.

15. A change web roll device having means governed by a fresh web roll for bodily moving the roll.

16. A change web roll device having means governed by a fresh web roll for applying paste to a web.

17. A change web roll device having means governed by a fresh web roll for separating the end of the web from the roll.

18. A change web roll device having means for governing roll changing mechanism by the fresh web roll.

19. The combination with change web roll mechanism of means for driving said mechanism from the fresh web roll.

20. A change web roll device having tapes and means governed by a fresh web roll for moving the tapes from the fresh web roll.

21. In a change web roll device, the combination of a web roll spindle, tapes adapted to engage the roll thereon, and means controlled by said spindle for moving the tapes from the roll.

22. In a change web roll device, the combination of means for rotating a web roll, movable arms supported adjacent to the web roll, and means controlled by the roll for moving said arms out of the way of said roll, said arms being adapted to support tapes bearing on the roll.

23. In a change web roll device, the combination of a web roll spindle, means for supporting and rotating the web roll, arms mounted adjacent to the web roll while in rotating position, tapes carried by said arms and bearing on the roll, and means operatively connected with said spindle for moving said arms out of engagement with the roll.

24. In a change web roll device, the combination of a web roll spindle, means for supporting and rotating the web roll, arms mounted adjacent to the web roll while in rotating position, tapes carried by said arms and bearing on the roll, means operatively connected with said spindle for moving said arms out of engagement with the roll, and means for engaging one of said arms and holding all of said arms out of contact with the roll.

25. In a change web roll device, the combination of a frame, an inclined plane adjacent to the frame, a pair of propelling drums mounted adjacent to the upper edge of said inclined plane for supporting a web roll, and a guard located between the drums to prevent the leading end of the roll from being bent back.

26. In a change web roll device, the combination of a pair of drums for supporting a web roll, and a guard located between the drums to prevent the leading end of the roll from being bent back.

27. In a change web roll device, the combination of a pair of drums for supporting the web roll, a pulley, connections between the pulley and said drums for rotating both of said drums in the same direction, a handle for shifting the belt on said pulley to control the rotation of the drums, and means for connecting together the end of a web supported by said drums and another web.

28. In a change web roll device, the combination of a pair of drums for rotating a roll, manually operated means for controlling the rotation of said drums, and means for connecting together two webs while one of them is supported upon the drums.

29. In a change web roll device, the combination of a pair of drums for supporting the web roll, a pulley, connections between the pulley and said drums for rotating both of said drums in the same direction, a handle for shifting the belt on said pulley to control the rotation of the drums, and means for connecting together the end of a web supported by said drums and another web while the drums are rotating at full speed.

30. In a change web roll device, the combination of a pair of drums for rotating a roll, manually operated means for controlling the rotation of said drums, and means for connecting together two webs while one of them is supported upon the drums, and while the drums are rotating at full speed.

31. In a change web roll device, the combination of a pair of drums for supporting a web roll, manually controlled means for controlling the rotation of said drums, and means for automatically connecting together a web supported by said drums and another web mounted in the device independently of the rotation of said drums.

32. In a change web roll device, the combination of a pair of drums for rotating a web roll with means for connecting two webs together while said rotating drums are operating at full speed.

33. In a change web roll device, the combination of means for rotating a web roll, with means for connecting two webs together while said rotating means is operating at full speed, and means controlled by the rotation of the spindle of the web roll for controlling the operation of said connecting means.

34. In a change web roll device, the combination of a rotatable web roll spindle, and means controlled by said spindle for connecting the web mounted thereon with another web while the parts are running at the full speed of the press.

35. In a change web roll device, the combination of a web roll spindle, a shaft, means connected with said spindle for rotating said shaft, means for connecting the web on the spindle with another web, and a clutch for connecting said shaft with said last named means.

36. In a change web roll device, the combination of a web roll spindle, a shaft, means connected with said spindle for rotating said shaft, means for connecting the web on the spindle with another web, and a clutch for connecting said shaft with said last named means, said clutch having means for preventing connection of the shaft with said means except when the spindle is in a certain definite position.

37. In a change web roll device, the combination of a rotatable web roll spindle, means operated from said spindle for connecting the web mounted thereon with another web, and a clutch for connecting said spindle with said means, said clutch having means for preventing connection between said parts except when the spindle is in a certain definite angular position.

38. In a change web roll device, the combination of a carriage having bearings for receiving a web roll spindle, a gear adapted to be connected with the web roll spindle, means for connecting two webs together, and means operated by said gear for controlling the operation of said means.

39. A web roll device, comprising a carriage having bearings for receiving a web roll spindle, a gear adapted to be mounted on the web roll spindle, a second gear meshing with said gear and rotatably mounted in bearings fixed on said carriage, and a friction device between the carriage and the second gear.

40. A change web roll device comprising a carriage having bearings for receiving a web roll spindle, a gear adapted to be mounted on the web roll spindle, a second gear meshing with said gear and rotatably mounted on said carriage, and a friction device between the carriage and the second gear, in combination with a third gear adapted to mesh with the second gear and means for connecting two webs together operated from said third gear.

41. In a change web roll device, the combination of a web roll spindle, a gear thereon, a second gear meshing with said gear, a third gear of the same size as the first gear adapted to mesh therewith and means operated from said third gear for connecting two webs together.

42. In a change web roll device, the combination of a carriage, a web roll spindle adapted to be supported thereby, a shaft, means connected with the shaft for moving the carriage, and means for rotating the shaft from said spindle at the same rate as the spindle rotates.

43. In a change web roll device, the combination of a carriage for supporting a web roll, with means controlled by the web roll for moving the carriage.

44. In a change web roll device, the combination of a pair of rotatable screws, carriages having partial nuts mounted on said screws, said carriages having bearings for a web roll spindle, a gear supported by a carriage for rotating said screws and means adapted to be connected with the web roll spindle for controlling said gear.

45. The combination of a pair of rotatable screws, carriages having partial nuts mounted on said screws and having bearings, a web roll spindle adapted to be mounted in said bearings, a gear rotatably mounted on a carriage for controlling the operation of said screws, and means for transmitting motion from the spindle to the gear.

46. The combination of a pair of rotatable screws, a carriage having partial nuts mounted on said gears and having bearings, a web roll spindle adapted to be mounted in said bearings, a gear rotatably mounted on the carriage, means for transmitting motion from the spindle to the gear, means for connecting two webs together, and means for operating said connecting means from said gear.

47. In a change web roll device, the combination of a pair of screws, means for rotating the screws simultaneously, a belt for driving said rotating means, a carriage having partial nuts resting on the screws and adapted to support a web roll, a belt-shifter for operating said belt, and means operable from a web roll spindle mounted on the carriage for operating said belt-shifter.

48. In a change web roll device, the combination of a feed screw, means for rotating the screw, a belt for driving said rotating means, a carriage having means for engaging the screws and adapted to support a web roll, a belt-shifter for operating said belt, means operable from a web roll spindle mounted on the carriage for operating said belt-shifter to rotate said screws, and means on the carriage for automatically moving the shifter to stop the rotation thereof when the carriage reaches a certain point.

49. In a change web roll device, the combination of a movable carriage for supporting a web roll, means for moving said carriage, a belt for operating said means, a belt-shifter for said belt, means operable by a web roll spindle on the carriage for shifting the belt to operate the moving means, a cam roll on the carriage, a lever having an arm with which said cam roll engages to shift the lever, and means connected with the lever for returning the belt-shifter to inoperative position.

50. In a change web roll device, the combination of a pair of sets of carriages each adapted to support a web roll spindle, means for moving said carriages along in the device, means controlled by the web roll spindle on the rear carriages for starting the moving means into operation, means controlled by said spindle for applying paste to the web on the forward carriages, and means on each set of carriages for stopping the carriage moving means at a certain point.

51. In a change web roll device, the combination of a carriage for a web roll, a belt for driving said carriage, a belt-shifter, and means controlled by the web roll for operating said belt-shifter to start the carriage.

52. In a change web roll device, the combination of a carriage for a web roll, a belt for driving said carriage, a belt-shifter, means connected with the carriage for automatically moving the shifter to stop the carriage, when the latter reaches a predetermined point.

53. In a change web roll device, the combination of a pair of sets of carriages each adapted to support a web roll spindle, means for moving said carriages along in the device, and means controlled by the web roll spindle on the rear carriages for starting the moving means into operation.

54. In a change web roll device, the combination of a carriage, means for moving the carriage, a web roll spindle adapted to be supported by the carriage, a shaft, means connected with said spindle for turning the shaft, means operable by said shaft for starting into motion the carriage moving means, means controlled by the rotation of said shaft for applying paste to a roll, means controlled by said shaft for severing the web from the roll after the paste is applied thereto, and means controlled by the shaft for directing the forward end of the web on said spindle into contact with the pasted portion of the web of said other roll.

55. In a change web roll device, the combination of a carriage, means for moving the carriage, a web roll spindle adapted to be supported by the carriage, a shaft, means connected with said spindle for turning the shaft, means operable by said shaft for starting into motion the carriage moving means, means controlled by the rotation of said shaft for applying paste to a roll, means controlled by said shaft for severing the web from the roll after the paste is applied thereto, means controlled by the shaft for directing the forward end of the web on said spindle into contact with the pasted portion of another web, and a clutch between said spindle and shaft for operatively connecting them together at a certain definite point during the revolution of the spindle.

56. In a change web roll device, the combination of a pair of sets of carriages adapted to support web rolls, means for moving said carriages, a shaft controlled by the rotation of the web of the rear carriages, a paste fountain, a paste roller, and means operable by said shaft for moving the paste roller from the fountain to the roll on the forward carriages.

57. In a change web roll device, the combination of means for rotating a web roll, a pair of shafts adjacent to the web roll, two sets of arms each controlled by one of said shafts, spindles on said arms, tapes on said spindles for engaging the web roll, means for turning said arms to and from the web roll, an arm connected with said turning means, a shaft operatively connected with the web roll spindle, and means on said shaft for operating said arm to separate the tapes and remove them from the web roll.

In testimony whereof I have hereunto set my hand, in the presence of two subscribing witnesses.

H. A. WISE WOOD.

Witnesses:
ANNIE B. WALTERS,
MARY E. McCADDER.